United States Patent [19]

Unmuth et al.

[11] Patent Number: 4,703,031
[45] Date of Patent: Oct. 27, 1987

[54] CATALYTIC REFORMING CATALYST WITH MODIFIED PORE SIZE DISTRIBUTION

[75] Inventors: Eugene E. Unmuth, Naperville; Bruce A. Fleming, Chicago, both of Ill.

[73] Assignee: Amoco Corporation, Chicago, Ill.

[21] Appl. No.: 925,793

[22] Filed: Oct. 30, 1986

Related U.S. Application Data

[62] Division of Ser. No. 884,736, Jul. 11, 1986.

[51] Int. Cl.$^4$ .................. B01J 23/36; B01J 23/42; B01J 23/44; B01J 23/62
[52] U.S. Cl. .................................. 502/339; 502/325
[58] Field of Search ..................... 502/334, 325, 339

[56] References Cited

U.S. PATENT DOCUMENTS

| 4,036,784 | 7/1977 | Gembicki et al. | 502/313 X |
| 4,082,697 | 4/1978 | Tamm | 208/138 X |
| 4,104,153 | 8/1978 | Erickson | 208/138 |
| 4,124,537 | 11/1978 | Gembicki et al. | 502/313 X |
| 4,216,123 | 8/1980 | Banks et al. | 502/325 X |

Primary Examiner—W. J. Shine
Attorney, Agent, or Firm—Robert E. Sloat; William H. Magidson; Ralph C. Medhurst

[57] ABSTRACT

An improved catalytic reforming catalyst and process are disclosed for converting hydrocarbons to higher octane products through use of a catalyst which has a specified surface area, pore volume and a modified pore volume distribution. The catalyst exhibits increased activity when used in a reforming process.

40 Claims, 4 Drawing Figures

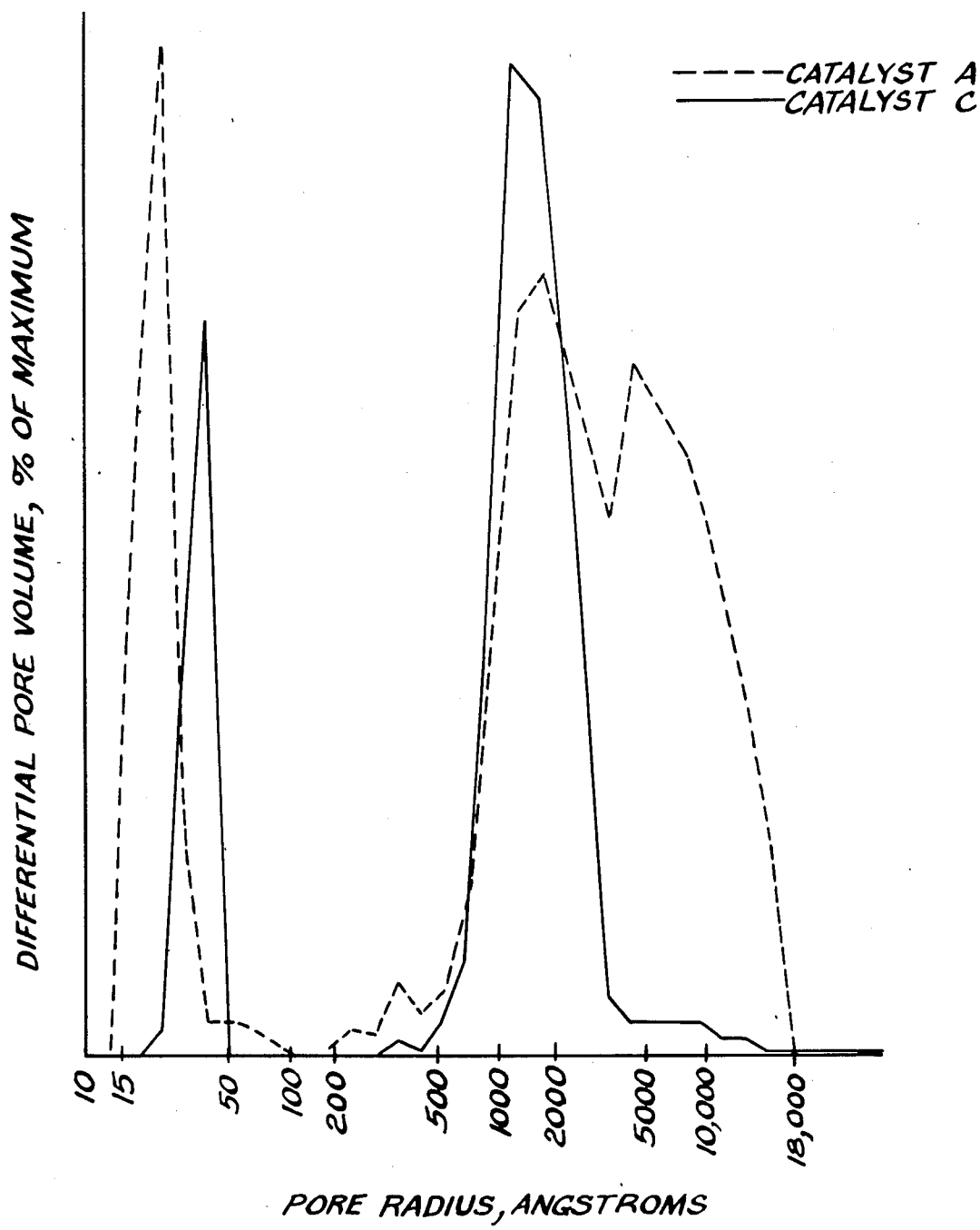
FIG. I

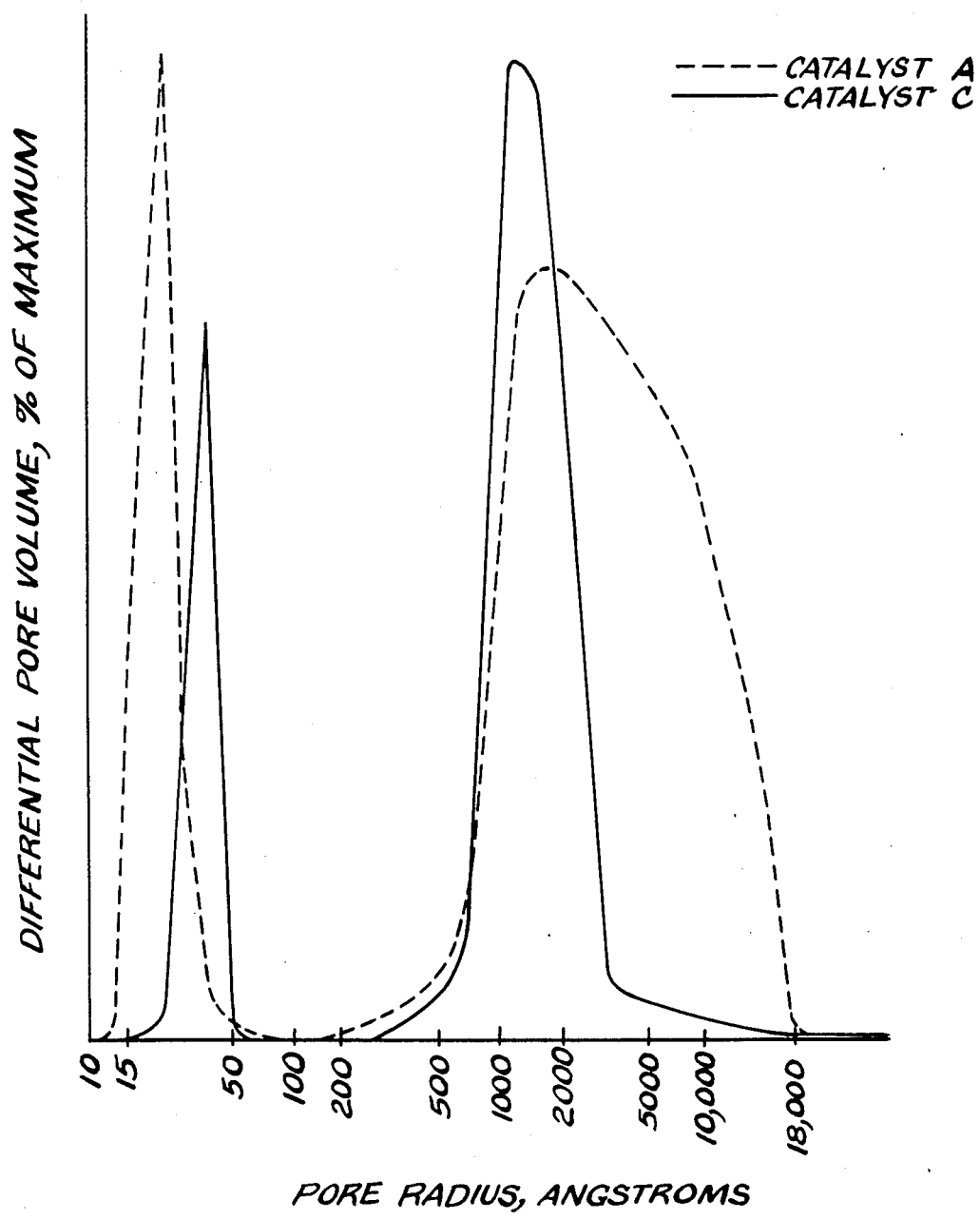
FIG. IA

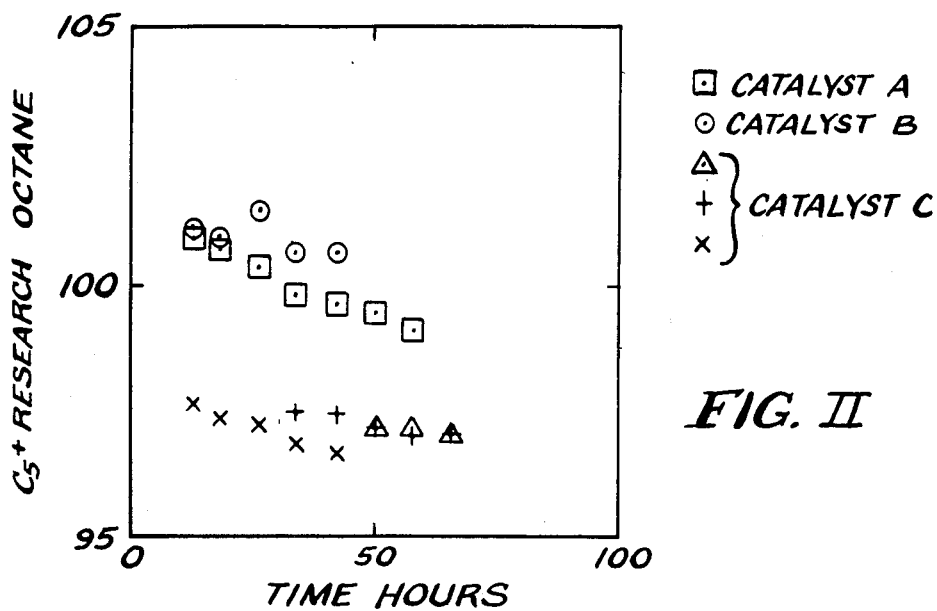
FIG. II
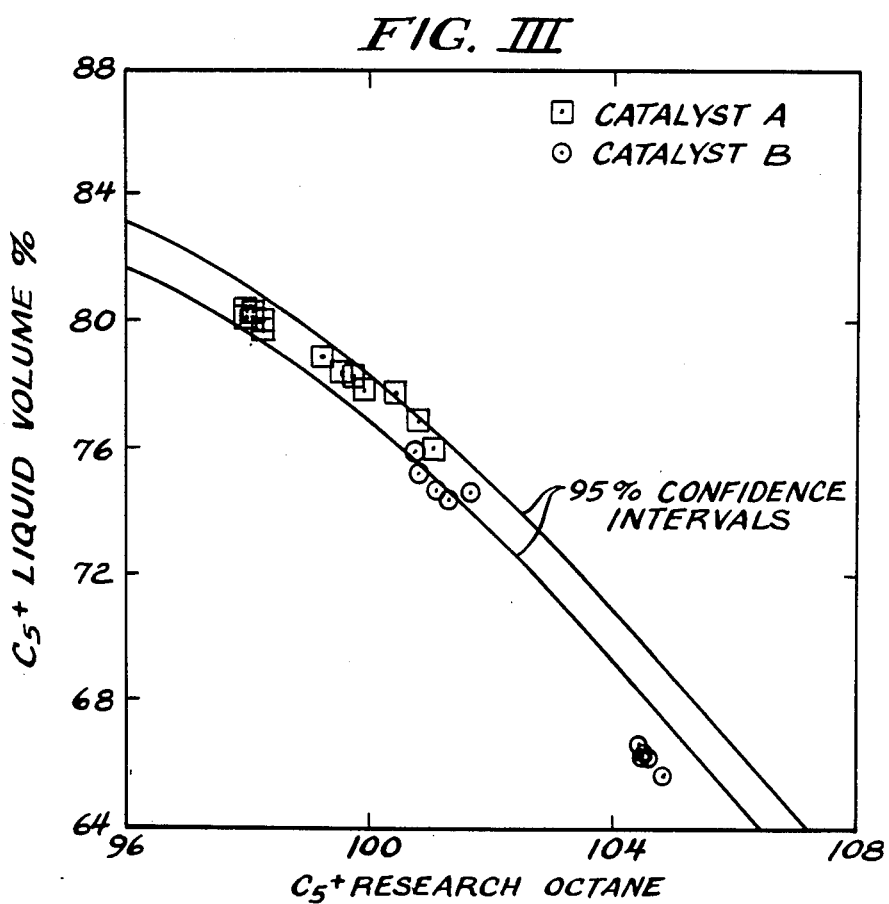
FIG. III 4,703,031

CATALYTIC REFORMING CATALYST WITH MODIFIED PORE SIZE DISTRIBUTION

This is a division of application Ser. No. 884,736, filed July 11, 1986.

BACKGROUND OF THE INVENTION (1) Field of the Invention

This invention is related to the conversion of hydrocarbon streams using a catalytic reforming catalyst having a modified pore size distribution and a reforming process using this catalyst.

(2) General Background

The reforming of hydrocarbon naphtha streams is an important petroleum refining process providing high octane hydrocarbon blending components for gasoline or for chemical processing feedstocks.

Catalytic reforming of naphthas can be carried out with several types of catalysts and in fixed or moving bed processes. Catalysts used in reforming processes generally contain a hydrogenation metal, typically a platinum group metal, to effect the conversion of the hydrocarbon naphtha feedstock to a product having increased value.

In the manufacture of reforming catalysts, many factors are considered to optimize the volume of high octane materials produced with a particular catalyst. In addition to varying the types and content of metals on the reforming catalyst base, modification of the physical properties of the catalyst base effect the catalyst's catalytic properties.

The primary physical properties of a catalyst base which can be changed during manufacture are surface area, pore volume and the distribution of pore sizes within the pore volume.

U.S. Pat. No. 4,082,697, Tamm, recognizes the need to modify the pore volume distribution of a reforming catalyst support to improve the catalytic properties of the finished catalyst. In particular, this patent discloses a specified pore volume of at least 0.5 cc/gram with at least 70 percent of the pore volume having pore diameters of from about 80 to 150 angstroms. Additionally, the pores having diameters greater than about 1,000 angstroms, according to the teachings of this patent, must be less than about 3 percent of the pore volume of the catalyst.

U.S. Pat. No. 4,104,153, Erickson, discloses a catalytic reforming catalyst in which alumina particles making up the catalyst support have a crystallite size of less than 100 angstroms which contributes to an increased porosity of the catalyst support and ultimately to improve catalytic properties of this catalyst. There is a general recognition that pore volume has an effect on the catalytic performance of the catalyst.

U.S. Pat. Nos. 4,036,784, Gembecki et al., and 4,124,537, Gembecki et al., both relate to the production of catalytic composite materials in which finished catalysts are produced by extruding an alumina which may contain catalytic hydrogenation metals. According to these patents, co-extrusion of the catalytic metals and the base material results in enhanced hydrodesulfurization catalyst activity when processing a vacuum gas oil feedstock.

U.S. Pat. No. 4,216,123, Banks et al., relates to catalysts for steam reforming of hydrocarbons and recognizes that a certain distribution of pore volume has a beneficial effect on catalyst activity.

Applicants have found that in modifying and controlling the pore volume distribution of a naphtha reforming catalyst base, increased catalytic activity can result when (1) surface area of the reforming catalyst is at least 250 square meters per gram, (2) the pore volume in pores having diameters of from about 30 to about 38,000 angstroms is greater than about 0.4, and (3) about 70 percent or less of the above pore volume is in pores having diameters of from about 30 to about 400 angstroms and about 30 percent or more of said pore volume is in pores having diameters of from about 400 to about 38,000 angstroms.

In particular, when the pore volume distribution of an experimental reforming catalyst had its base properties modified as described above, it showed a large increase in activity when compared to a prior art commercially used catalyst having a similar composition except for the catalyst base properties. There were additional catalytic effects which depended on the particular stage of catalyst manufacture when catalytic metals were placed on the experimental catalyst (e.g., before extrusion of the catalyst base or after extrusion of the base). The selectivity of the claimed catalyst for producing high octane $C_5+$ materials was generally equal to the prior art catalyst.

The modified pore volume distribution is thought to result from (1) initially working or densifying the support (e.g., mulling) prior to extrusion, or (2) calcining the extrudate at a controlled relatively low temperature of from about 800° F. to about 1200° F., or (3) the use of PHF type alumina (e.g. spray dried, high purity alumina produced from a gelled sol) or combinations of the above.

Applicants' invention described herein, therefore, presents an advance in the art by providing a naphtha reforming catalyst having improved activity and can beneficially be used in the refining industry for producing higher quality gasolines or chemical processing feedstocks.

SUMMARY

The present invention can be summarized as an improved catalytic reforming catalyst and process using the same which can be used for conversion of hydrocarbons such as naphthas into more valuable products.

It is an object of the present invention to provide a catalytic hydrocarbon reforming catalyst which possesses increased activity for the production of $C_5+$ materials from naphtha feedstocks while maintaining selectivity for the production of high octane $C_5+$ materials. It is another object of the present invention to provide a catalytic reforming process using the catalyst described above.

It is another object of the present invention to provide a hydrocarbon reforming catalyst and process in which a specific surface area, pore volume and distribution of pore volume results in a catalyst having (1) an increased activity when compared to prior art catalysts and (2) a selectivity for the production of the high octane $C_5+$ gasoline materials generally equal to prior art catalysts.

BRIEF DESCRIPTION OF THE DRAWINGS

FIGS. I through III show the benefits accompanying the inventive catalysts tested in the Examples.

FIG. I shows the change in pore volume distribution when comparing a commercially available prior art catalyst (Catalyst C) and one catalyst embodied by the invention (Catalyst A). In particular, the data shown in FIG. I represent results of mercury porosimetry measurements of the two above catalysts. Specifically, there is plotted the pore radius for the various pores measured versus the differential pore volume reported for the various pore radii measured and represented as a percent of the maximum pore volume value obtained for any specific pore radius. As can be seen in FIG. I, there is a distinct shifting in the pore volumes represented by Catalyst A and the prior art Catalyst C. For Catalyst A, there is an increase in the pore volume of pores having radii from about 200 to about 38,000 angstroms when compared to the pore volume for prior art Catalyst C falling in the similar pore size range. For Catalyst A, there is also a decrease in the pore volume of smaller pores (those having radii from about 15 to about 200 angstroms) when compared to the prior art Catalyst C for the same pore size range. For Catalyst A there is a shift in the maximum of the differential pore volume of the smaller pores (those having radii from about 15 to about 200 angstroms) to a smaller mean pore radius as shown in FIG. I.

Tables I and II in the specification show the mercury porosimetry data generated for Catalysts A and C, respectively. These data were used to generate the plots shown in FIG. I. FIG. IA contains a plot based on the same data, except background noise and some of the peak values have been modified to give a "smoother" curve. To simplify the description of the invention and conform to generally accepted practices, all further reference to pore sizes in this specification shall refer to diameters rather than radii as reported in FIGS. I and IA.

FIG. II shows comparative results of testing identical feedstocks under essentially identical reforming process conditions of five separate catalysts. Catalysts A and B were compared with three runs using a prior art Catalyst C. FIG. II shows, over a period, the octane value of the $C_5+$ material produced using the above described catalysts. In particular, Catalyst A is represented by the squares shown, Catalyst B is shown by the circles while three runs on prior art Catalyst C are represented by the triangle, X's and plus marks shown in FIG. II.

As observed in FIG. II, both Catalysts A and B, which represent catalyst coming within the scope of the invention claimed herein, showed improved octane production capability (activity) over time when compared to the prior art Catalyst C. For the period of the test, Catalysts A and B demonstrated as much as a four octane number increased activity over prior art Catalyst C.

FIG. III illustrates the selectivity data ($C_5+$ liquid yield versus research octane number) for Catalysts A and B compared to prior art Catalyst C. The data generated in FIG. III used the same prior art catalysts used in FIG. II. The two solid lines represent the 95 percent confidence intervals developed over the range of liquid yields and octanes shown in FIG. III for the prior art catalyst.

In FIG. III, Catalyst A is illustrated by the squares while Catalyst B is represented by the circles. One interesting point to be noticed in FIG. III is that the yields for Catalyst A, which had its catalytic metals mixed with the catalyst base before extrusion and formation of the finished catalyst, generally lie on the top portion of the 95 percent confidence interval, while the yields for Catalyst B, which was impregnated with catalytic metals after the base had been extruded and calcined, lie at the lower limit of the 95 percent confidence interval. This indicates there is a statistical difference in catalyst performance, based on selectivity, depending on whether the catalytic metals are placed on the catalysts after the base has been extruded (e.g., Catalyst B) or whether the catalytic metals are placed on the base before the catalytic support has been extruded (e.g., Catalyst A).

DESCRIPTION OF THE PREFERRED EMBODIMENTS

In a broad embodiment, there is provided a catalytic naphtha reforming catalyst having at least one catalytic metal deposited on a porous solid catalyst support, an improvement which comprises the catalyst having the following in combination: (a) a catalytic surface area above about $250M^2$/gram of catalyst; (b) a pore volume above about 0.4 cc/gram of catalyst in pores having diameters of from about 30 angstroms to about 38,000 angstroms, and (c) a pore volume distribution wherein 70 percent or less of said pore volume is in pores having diameters of from about 30 to about 400 angstroms and 30 percent or more of said pore volume is in pores having diameters of from about 400 to about 38,000 angstroms.

In a more preferred embodiment, the surface area of the above catalyst is above about $275M^2$/gram, and in a most preferred embodiment the surface area of the above catalyst is above about $300M^2$/gram. In another preferred embodiment, pore volume is at least 0.45 cc/gram, and in a most preferred embodiment, at least 0.5 cc/gram.

In another preferred embodiment, about 68 percent or less of said pore volume is in pores having diameters of from about 30 to about 400 angstroms and about 32 percent or more of said pore volume is in pores having diameters of from about 400 to 38,000 angstroms. In a most preferred embodiment, about 65 percent or less of said pore volume is in pores having diameters of from about 30 angstroms to about 400 angstroms and about 35 percent or more of said pore volume is in pores having diameters of from about 400 to 38,000 angstroms.

Surface area, pore volume, pore size and pore distribution values used herein are based on standard techniques used in the catalyst industry.

For example, catalytic surface area was calculated using multiple-point/single-point BET techniques using a Digisorb Analyzer manufactured by Micromeritics Instrument Corporation. This technique is more particularly described in S. Bunauer, P. E. Emmett, and E. Teller, J.A.C.S. 60 (1938), p. 309.

The pore volume, pore size and pore distribution measurements were made using mercury porosimetry techniques on an instrument manufactured by Micromeritics Instrument Corporation.

The mercury porosimetry measurement technique is described by Winslow and Shapiri in "An Instrument for Measurement of Pore Size Distribution by Mercury Penetration," *ASTM Bulletin,* February 1959. Mercury contact angle in the pore is particularly important in pore-size distribution calculations based on mercury penetration data. A contact angle of 140° was assumed in calculating all the pore-size distributions referred to herein.

The measurements were made on finished catalyst although there is little difference between values obtained on this material and the unfinished carrier material. For this specification, the above measurements can be made on either the catalyst support alone or the finished catalyst.

In another preferred embodiment, there is provided a catalytic reforming process for conversion of a naphtha hydrocarbon, at reforming conditions, using a catalyst comprising at least one platinum group metal and an alumina support in which the catalyst has properties described above.

The catalyst claimed herein can be used to reform feedstocks such as virgin or cracked naphthas or other hydrocarbon fractions boiling in the gasoline boiling range. It may also reform partially reformed naphthas and other hydrocarbon streams which typically will have a boiling range of from about 70° to about 500° F. preferably about 180° to 400° F.

Since many of the above feedstocks may contain appreciable amounts of impurities such as nitrogen and sulfur compounds, which can be deleterious to the catalyst in a reforming process, the feed is often subjected to a suitable hydrotreating step before passage into the reforming zone so that the impurities can be reduced to tolerable levels.

The catalyst claimed herein is produced by placing a catalytically effective amount of a catalytic metal on a porous carrier material. The carrier materials which are used as catalyst supports are preferably materials that have a porous, high surface area above about 250$M^2$/gram to about 500$M^2$/gram or more. The carrier materials can be inert to the conditions used in the reforming process and can include traditional materials such as ceramics, clays, aluminas, silica-alumina compositions or many other inorganic oxides known to the art. In some instances, the support can contain materials such as faujasites, mordenites, crystalline aluminosilicates or crystalline borosilicates, or other similar materials, whether synthetically prepared or naturally occurring, to enhance the various reactions required in catalytic reforming. Carbon supports are also possible as carrier materials.

The preferred porous carrier materials are aluminas such as crystalline gamma, eta and theta alumina with gamma or eta alumina giving the best results. The alumina carrier may also contain minor portions of other known refractory or active materials depending on the particular catalytic properties desired.

The carrier materials can be pilled or extruded into various shapes depending on the particular requirements of the reforming process. Additionally, the size of the carrier materials can vary. Typically, these materials have nominal diameters of from about 1/20 to about ⅛ of an inch overall diameter with the lengths approximating, or in some instances being longer than, the above diameters.

The surface area of the porous carriers should be regulated to maintain a catalytic surface area, when measured by BET analytical procedures described herein, so that the carrier support whether measured as a finished catalyst or as unfinished base or carrier material has a surface area of at least 250$M^2$/gram, preferably at least about 275$M^2$/gram and even more preferably above about 300$M^2$/gram. The upper practical surface area is about 500$M^2$/gram or less and generally less than about 400$M^2$/gram.

The pore volume of finished catalyst or unfinished base or carrier material for pores having nominal diameters from about 30 to about 38,000 angstroms should be at least above about 0.4 cc/gram and preferably above about 0.45 cc/gram, and even more particularly above about 0.5 cc/gram of catalyst. The upper practical pore volume is about 2.0 cc/gram of catalyst. The pore volume measurements described herein are measured using the standard mercury porosimetry techniques described herein.

The pore volume distribution of the pores having nominal diameters from about 30 to about 38,000 angstroms should be 70 percent or less in pores having diameters of from about 30 to about 400 angstroms diameter while 30 percent or more of this pore volume should be in pores having pore diameters of from about 400 to about 38,000 angstroms.

In a more preferred instance, the carrier base or finished catalysts should be produced to maintain a pore volume distribution, for the above pore volume, in which 68 percent or less is made up of pores having pore diameters of from about 30 to about 400 angstroms diameter while about 32 percent or more of the pore volume constitutes pores having diameters of from about 400 to about 38,000 angstroms. In a most preferred instance, production of the catalyst support or the finished catalyst is regulated to produce a pore volume distribution in which 65 percent or less of the total pore volume as described above, is in pores having diameters of from about 30 to about 400 angstroms diameter while 35 percent or more of the above pore volume is in pores having diameters of from about 400 to about 38,000 angstroms.

The carrier material having the properties described above can be produced using many of the art recognized methods including extrusion, pilling or oil dropping to form an appropriate size base followed by drying, calcination and metal impregnation. Sometimes the metal can be blended with the carrier material before formation of solid base material.

A preferred manner of producing the catalyst claimed herein is to mix a sprayed-dried alumina powder with binders and a liquid material, generally water, to a proper consistency paste which can ultimately be extruded to produce the appropriate size catalyst particles. Typically, the sprayed-dried alumina powder is mixed with an aqueous solution and then processed under shear-mixing conditions to achieve a uniform dispersion of the components in the resulting paste. Shear-mixing can be done with means comprising a multitude of blades or paddles rotating in adjacent planes about a common shaft, with a shearing or grinding effect resulting from minimal clearance between the rotating blades and the side walls, or between the various rotating blades, or between the rotating blades and one or more stationary shear bars. Shearing mixers are typically designed to maintain the total mixture near to the rotating blades or paddles to take full advantage of the induced shearing effect and enhanced mixing. The power input per mass of material being mixed is a convenient measure of the intensity or severity of the mixing operation. Typically, this value can increase over a wide range depending on the viscosity of the paste being processed.

Shear-mixing operations can typically be characterized as mulling and can be practiced in commercially available apparatus. In particular, a Beardsley and Piper speed mullor can be used for the initial mulling or shear-mixing of the refractory oxide powder and liquids. After the material has been mulled long enough to allow sufficient mixing, the resulting paste can be side extruded to the proper consistency for final extrusion. During final extrusion, the paste is pressured through a perforated plate and material extruded (extrudate) is then cut into particles of desired length before drying and calcining by a rotating knife as the extrudate emerges from the perforation plate or die.

The time, temperature and other conditions for mulling as described above can be varied depending on the amount of liquid and powder used, the size of the mullor, the specific rotating energy and the speed of the shearing which takes place in the mullor. Typically, materials can be mulled anywhere from a few seconds up to 25 or more minutes, or sometimes where extensive working is required, up to an hour or more.

The final extrusion step can include operating conditions well known to those in the art including pressures, temperatures and speed of extrusion which will produce a catalyst particle having reasonable physical strength and the desired surface area, pore volume and pore volume distribution required of the invention claimed herein. The extrusion dye should be of a size and shape to allow production of catalyst particles having a uniform diameter of anywhere from 1/16 or less to ½ inch or greater. Preferable catalyst sizes are those in which diameter is approximately 1/12 of an inch with a length of the material corresponding to the diameter. In some instances the particle length is larger than the diameter by up to two or more times.

After extrusion, the extrudate is dried and calcined. Drying is usually accomplished at a temperature of up to about 200° F. over a 1 to 24-hour period followed preferably by a low temperature calcining which is generally in an oxidizing atmosphere, such as air, at temperatures anywhere from about 550° to about 1200° F. over a period from about 1 to about 4 hours.

More preferably, the low temperature calcination is at a temperature of from about 800° to about 1200° F. This is a lower temperature than is conventionally used in the industry. Typically, reforming catalysts are calcined at temperatures around 1400° F. or higher.

Applicants have found that by using a lower calcination temperature, the pore volume distribution of finished catalyst can be modified to result in improved catalytic properties.

There is a slight selectivity effect, discussed in the Examples, which depends on when the catalytic metal which is placed on the catalyst. If the metal is added to the paste before extrusion, an improvement in selectivity results when compared to catalysts where the metal is placed on the carrier after it has been extruded. The reason for the improvement resides in the fact that the catalytic metals have a more uniform distribution throughout the catalyst particles when incorporated into the paste before final extrusion. Accordingly, adding the hydrogenation metal to the carrier material before extrusion is a preferred method of catalyst preparation.

The catalytic metal or hydrogenation metal used on reforming catalysts is typically a platinum group metal defined as the fifth and sixth periods of the Group VIII metals of the Periodic Table. The platinum group metals include platinum, iridium, ruthenium, rhodium, palladium and osmium or mixtures thereof. The catalytic metals can include one or more of the platinum group metals, and additional metals or materials are described below. The preferred platinum group metals include platinum or palladium individually or mixtures thereof. Generally, the amount of the platinum group metal in the final catalyst composite is small compared to the quantities of the other components contained therein.

The platinum group metal generally will comprise from about 0.01 to about 2.5 percent of the final catalytic composite calculated on an elemental basis. Excellent results are obtained when the catalyst contains from about 0.05 to about 1 weight percent of the platinum group metal or metals. Particularly preferred mixtures of these metals are platinum and palladium. Platinum as the sole platinum group metal is especially preferred.

The platinum group metal may be incorporated into the catalytic composite by any suitable manner known to result in a relatively uniform distribution of this component in the carrier such as coprecipitation or cogellation, ion exchange or impregnation. Sometimes the platinum group metal and other metals, if used in the catalyst, can be incorporated into the carrier material before final extrusion.

The preferred method of depositing the catalytic hydrogenation metals involves utilization of a soluble decomposable compound of a platinum group metal to impregnate the carrier material after it has been extruded or to use a similar material which can be mixed during the mulling or extruding operation. Examples of platinum group materials which can be used include aqueous solutions of chloroplatinic acid. Other water soluble compounds or complexes of the platinum group metals may be employed.

Rhenium is an optional component and is preferably used in an amount sufficient to result in a final catalytic composite containing about 0.01 to about 3 percent rhenium and preferably about 0.05 to about 1 weight percent calculated on an elemental basis.

The rhenium component may be incorporated into the catalytic composite in any suitable manner and in any stage in the preparation of catalysts described above for the platinum group metal. The rhenium component promotes coke tolerance of reforming catalysts rather than effecting yields.

Tin may be also incorporated into the catalyst material in any suitable manner known to the art resulting in a uniform dispersion of tin on the carrier material. The tin component can be presented as an aqueous material and incorporated into the catalyst support as described above for the platinum group component. It has been found in many commercial operations where tin is used that increased yields and selectivity result when this material is combined with platinum.

The tin component can be incorporated into the catalyst to result in the composite containing anywhere from about 0.01 to about 3 weight percent tin and preferably from about 0.05 to about 1 percent by weight of tin.

Other metals or activators may be added to the catalyst and these materials are well known to those in the art.

A halogen component is generally added to reforming catalysts to modify catalytic properties. Although the precise form of the association of the halogen component with the carrier material is not entirely known, it is customary in the art to refer to a halogen component as being combined with a carrier material or with the other ingredients of the catalyst such as the metallic components. The combined halogen may be either fluorine, chlorine, iodine, bromine or mixtures thereof. Of these, fluorine and chlorine are the preferred with chlorine especially being preferred. The halogen may be added to the carrier material in any suitable manner either during the preparation of the support or before or after the addition of any of the other components such as the metallic catalyst components. For example, the halogen may be added to the carrier material as an aqueous solution of a suitable decomposable halogen containing compound such as hydrogen fluoride, hydrogen chloride, hydrogen bromide or ammonium chloride. For reforming operations the halogen will typically be combined with the carrier material in an amount sufficient to result in a final composite that contains from about 0.1 to about 3.5 percent and preferably about 0.5 to about 1.5 percent by weight of halogen calculated on an elemental basis.

Additional amounts of the halogen component may also be added to the catalyst after regeneration during what the art refers to as rejuvenation.

The amount of the rhenium component is ordinarily selected so that the atomic ratio of rhenium to platinum group metal(s) contained in the catalytic composite is about 0.1:1 to about 3:1, with the preferred range being about 0.25:1 to about 1.5:1. Similarly, the amount of the tin component is ordinarily selected to produce a composite containing an atomic ratio of tin to platinum group metal(s) of about 0.1:1 to about 3:1, with the preferred range being about 0.25:1 to about 2:1.

Another significant parameter for the instant catalyst is the total metals content which is defined to be the sum of the platinum group component and the tin and rhenium component, if present, calculated on an elemental metal basis. Good results are ordinarily obtained with the subject catalyst when this parameter is fixed at a value of about 0.15 to about 5 weight percent, with best results ordinarily achieved at a total metals loading of about 0.3 to about 2 weight percent.

A preferred reforming catalyst comprises a combination of a platinum group component, a tin component, and a halogen component on an alumina carrier material in amounts sufficient to result in the composite containing about 0.5 to about 1.5 weight percent halogen, about 0.05 to about 1 weight percent platinum group component, and about 0.05 to about 2 weight percent tin. Accordingly, specific examples of an especially preferred reforming catalyst comprise: (1) a combination of from about 0.1 to about 1.0 weight percent tin, from about 0.1 to about 1.0 weight percent platinum and from about 0.5 to about 1.5 weight percent halogen on an alumina carrier material; (2) a catalyst composite comprising a combination of from about 0.1 to about 0.75 weight percent tin, from about 0.1 to about 0.75 weight percent platinum and from about 0.5 to about 1.5 weight percent halogen on an alumina carrier material; (3) a catalytic composite comprising a combination of about 0.4 weight percent tin, 0.4 weight percent platinum and about 0.5 to about 1.5 weight percent halogen on an alumina carrier material; (4) a catalytic composite comprising a combination of about 0.4 weight percent tin, from about 0.1 to about 0.75 weight percent platinum and from about 0.5 to about 1.5 weight percent halogen on an alumina carrier material; (5) a catalytic composite comprising a combination of from about 0.1 to about 0.75 weight percent tin, about 0.4 weight percent platinum and from about 0.5 to about 1.5 weight percent halogen on an alumina carrier material; and (6) a catalytic composite comprising a combination of from about 0.2 to about 0.5 weight percent tin, from about 0.2 to about 0.5 weight percent platinum and from about 0.5 to about 1.5 weight percent halogen on an alumina carrier material. The amounts of the components reported above are calculated on an elemental basis.

Another preferred reforming catalyst comprises a platinum and a halogen component on an alumina carrier in amounts sufficient to result in the composite containing about 0.5 to about 1.5 weight percent halogen and about 0.05 to about 1 weight percent based on the catalyst composite of a platinum group metal which is preferably platinum. Optionally, this catalyst can contain rhenium as a second metallic component in an amount ranging from about 0.05 weight percent to about 2 weight percent and preferably from about 0.05 weight percent to about 1 weight percent of the catalyst.

Accordingly, specific examples of an especially preferred reforming catalyst comprise: (1) a combination of from about 0.1 to about 0.75 weight percent platinum and about 0.5 to about 1.5 weight percent halogen with an alumina carrier material; (2) a catalyst composite comprising a combination of from about 0.1 to about 0.75 weight percent platinum, from about 0.1 to about 0.75 weight percent rhenium and about 0.5 to about 1.5 weight percent halogen on an alumina carrier material; (3) a catalytic composite comprising a combination of about 0.4 weight percent platinum, about 0.4 weight percent rhenium and about 0.5 to about 1.5 weight percent halogen on an alumina carrier material; (4) a catalytic composite comprising a combination of about 0.4 weight percent platinum, about 0.1 to about 1.0 weight percent rhenium and about 0.5 to about 1.5 weight percent halogen on an alumina carrier material; and (5) a catalytic composite comprising a combination of from about 0.1 to about 1.0 weight percent platinum, about 0.4 weight percent rhenium and about 0.5 to about 1.5 weight percent halogen on an alumina carrier material. The amounts of the components reported above are calculated on an elemental basis.

The process of this invention can be practiced in any of the well-known naphtha reforming processes which are commercially practiced. These include fixed bed, fluid bed or moving bed type operations.

The present invention can be practiced in semiregenerative type processes in which the catalyst is regenerated infrequently (up to a year or more between regenerations) or in cyclic reforming processes, typically called the Cyclic Ultraforming Process as practiced by Amoco Oil Company, or in moving bed reforming processes.

In the cyclic processes one reaction zone is segregated during normal operations and put through a regeneration and reactivation procedure and thereafter phased back into the reaction train. Another reaction zone in the reaction train is then segregated from the active process, purged and put the through the same cycle of regeneration and reactivation. A swing reactor is provided to replace the reactor being regenerated during the process cycle. In such cyclic processes the catalyst is maintained in a relatively fresh state compared to the semiregenerative type processes.

In catalytic reforming of naphthas many different reactions take place within the various reaction zones. Typically, dehydrogenation of cyclic paraffins takes place in the initial reaction zones, followed by dehydrocyclization in the intermediate reaction zones with hydrocracking generally occurring in the terminal reaction zones.

Typical reforming operating conditions that can be used in the present invention comprise a reactor inlet temperature of about 800° to about 1000° F., a pressure of about 50 p.s.i.g. or less to about 1000 p.s.i.g., a weight hourly space velocity (WHSV) of about 0.5 to about 10 and a hydrogen circulation rate of about 1,000 standard cubic feet per barrel (SCFB) to about 15,000 SCFB. Preferred operating conditions comprise an inlet temperature of about 940° to about 980° F., a pressure of about 50 p.s.i.g. to about 300 p.s.i.g., a WHSV of about 1 to about 8 and a hydrogen circulation rate of about 3,000 SCFB to about 10,000 SCFB.

The claimed process can be carried out in any of the conventional types of equipment known in the art. One may, for example, use catalysts as pills, pellets, granules, broken fragments or various special shapes, disposed in one or more fixed beds within one or more reaction zones, and the feed may be passed there-through in the liquid, vapor or mixed phase, and in side ways, upward or downward flow. Fluidized-solid processes, in which the feed is passed upward through one or more turbulent beds of finely divided catalyst may also be used and the suspension processes, in which the catalyst is slurried in the charging stock and the resulting mixture is conveyed into one or more reaction zones.

The reaction products are removed from the reaction zones and fractionated to recover various components. The hydrogen and unconverted materials are recycled as desired. The excess hydrogen produced in a reformer can conveniently be used in the hydrodesulfurization of the naphtha feed, if needed.

In the Examples, a series of tests were run to show the advantages possessed by the catalyst and process of this invention. Three catalysts were used in the Examples and their method of preparation is described in the Examples.

EXAMPLE I

In this Example, Catalyst A, which illustrates a catalyst claimed herein, was produced by blending 600 grams of a commercially available PHF alumina powder with 30 grams of Sterotex brand binder in a ball mill for 1 hour. A solution of 260 grams water and sufficient HCl, and chloroplatinic and perrhenic acid solutions to make up 283.5 grams of total solution was blended as described below with the PHF alumina powder.

The PHF alumina powder was prepared by digesting amalgamated high purity aluminum with acetic acid containing water to produce an alumina sol. The sol was gelled with ammonium hydroxide, spray dried and screen milled to less than 325 mesh.

The concentration of HCl, platinum and rhenium were regulated to produce 0.4 weight percent platinum, 0.4 weight percent rhenium and 1.2 weight percent chloride on the alumina (on a water-free basis).

The PHF powder was placed in a mullor which was turned on and the above solution added very slowly. The resulting paste was worked for about 20 minutes in the mullor. Small additions of water were made to the resulting paste.

The paste was mulled at a high speed setting, side extruded and then extruded through a 5/64-inch die plate. The resulting extrudate appeared wet so it was dried at 250° F. for 10 minutes and then again mulled, side extruded and finally extruded through a 5/64-inch die.

The resulting extrudate was dried overnight at 250° F. and then calcined at 1000° F. for 3 hours.

The finished catalyst contained 0.5 weight percent platinum, 0.63 weight percent rhenium and 1.04 weight percent chloride.

Mercury porosimetry analysis for finished Catalyst A is reported in Table I below. Based on this analysis, Catalyst A had an average pore diameter of about 82 angstroms.

Catalyst A also had a total pore volume of 0.5197 cc/g. for pores having diameters in the range of from about 30 to 38,000 angstroms. Pores of diameters from 30 to 400 angstroms represented 65.1 percent of this pore volume, while pores of diameters from 400 to 38,000 angstroms represented 34.9 percent of this volume. Using the BET surface area analysis described above, its catalytic surface area was about $310 M^2$/gram of catalyst. This catalyst also had a particle density of 1.13 g/cc and an average bulk density of 34.30 lb./ft$^3$.

TABLE I

| CATALYST A MERCURY POROSIMETRY DATA | | | |
|---|---|---|---|
| PRESSURE, PSIA | PORE RADIUS, MICRO-M (ANGSTROMS × $10^{-4}$) | CUMULATIVE INTRUSION VOLUME, CC/GRAM | DIFFERENTIAL VOLUME, CC/GRAM |
| +16.1 | +5.4839 | +0.0000 | +0.0000 |
| +46.8 | +1.8881 | +0.0016 | +0.0015 |
| +283.3 | +0.3120 | +0.0507 | +0.0492 |
| +354.6 | +0.2493 | +0.0872 | +0.0365 |
| +868.4 | +0.1018 | +0.1447 | +0.0575 |
| +1463.2 | +0.0604 | +0.1578 | +0.0130 |
| +1742.6 | +0.0507 | +0.1653 | +0.0075 |
| +2182.2 | +0.0405 | +0.1671 | +0.0018 |
| +2912.3 | +0.0303 | +0.1741 | +0.0070 |
| +3475.9 | +0.0254 | +0.1780 | +0.0039 |
| +3912.1 | +0.0226 | +0.1797 | +0.0016 |
| +4366.3 | +0.0202 | +0.1813 | +0.0016 |
| +4996.9 | +0.0177 | +0.1837 | +0.0024 |
| +5831.5 | +0.0152 | +0.1839 | +0.0002 |
| +6256.4 | +0.0141 | +0.1840 | +0.0001 |
| +6725.3 | +0.0131 | +0.1863 | +0.0023 |
| +7340.7 | +0.0120 | +0.1901 | +0.0038 |
| +8029.3 | +0.0110 | +0.1901 | +0.0000 |
| +8820.5 | +0.0100 | +0.1925 | +0.0024 |
| +9787.5 | +0.0090 | +0.1940 | +0.0016 |
| +10989.0 | +0.0080 | +0.1940 | +0.0000 |
| +11648.3 | +0.0076 | +0.1964 | +0.0024 |
| +12439.5 | +0.0071 | +0.1994 | +0.0030 |
| +13450.5 | +0.0066 | +0.2009 | +0.0015 |
| +14608.0 | +0.0061 | +0.2039 | +0.0030 |
| +15926.7 | +0.0055 | +0.2083 | +0.0044 |
| +17523.8 | +0.0050 | +0.2113 | +0.0030 |
| +18549.4 | +0.0048 | +0.2120 | +0.0008 |
| +19604.4 | +0.0045 | +0.2150 | +0.0029 |
| +20732.6 | +0.0043 | +0.2193 | +0.0044 |
| +21948.7 | +0.0040 | +0.2216 | +0.0022 |
| +23340.6 | +0.0038 | +0.2267 | +0.0051 |
| +24893.7 | +0.0036 | +0.2311 | +0.0044 |
| +27091.5 | +0.0033 | +0.2442 | +0.0131 |
| +29142.8 | +0.0030 | +0.2609 | +0.0167 |
| +31677.6 | +0.0028 | +0.2965 | +0.0356 |
| +35135.5 | +0.0025 | +0.3627 | +0.0662 |
| +38974.3 | +0.0023 | +0.4412 | +0.0785 |
| +44205.1 | +0.0020 | +0.4950 | +0.0538 |
| +50417.6 | +0.0018 | +0.5197 | +0.0247 |

EXAMPLE II

In this Example, Catalyst B, which illustrates a catalyst claimed herein, was produced by blending 600 grams of PHF alumina powder produced as described in Example I with 30 grams of Sterotex brand binder in a ball mill for 1 hour. The blended powder was added to a mullor and 200 grams of water were slowly added. The resulting paste was mulled for 20 minutes. Over approximately an additional 20 minutes, 110 grams of additional water were added to the paste while mulling continued. The resulting paste was side extruded and then finally extruded through a 5/64-inch die.

The resulting extrudate was dried overnight at 250° F. and then calcined for 3 hours at 1000° F.

An aqueous solution containing HCl, platinum and rhenium was made up to produce a finished catalyst having 0.4 weight percent platinum, 0.4 weight percent rhenium and 1.2 weight percent chloride.

The above extrudate was placed in a rotary impregnator and contacted with the above aqueous solution. The impregnated extrudate was initially dried with an infrared light, thereafter dried in a vacuum overnight and calcined at about 938° F. for 3 hours. Its BET surface area, when measuring the base material before metal impregnation, was about 320M²/gram of catalyst.

EXAMPLE III

Catalyst C (which represented a typical prior art catalyst) was a commercially available platinum-rhenium catalyst containing 0.39 weight percent platinum, 0.42 weight percent rhenium and 0.92 weight percent chloride, all on an elemental basis and based on the finished catalyst. The average bulk density of this material was 41.91 lb./cubic foot and its particle density was 1.29 g/cc. It had a surface area of about 185 square meters per gram when measured using the BET analytical procedure and was produced as a 1/12-inch extrudate.

Catalyst C was produced using the PHF alumina powder, produced as described in Example II, which was mulled with Superflock brand extrusion aid and water and finally extruded. After the extrudate was dried, it was calcined at approximately 1400° F. in air. The extrudate was then washed, dried and recalcined at 1100° F.

The extrudate was then sprayed with an aqueous solution of chloroplatinic and perrhenic acids together with a penetration aid (see U.S. Pat. No. 3,032,512) to place metals on the extrudate support. Thereafter, the extrudate was finally dried and calcined in air at 1100° F.

Mercury porosimetry data for finished Catalyst C is reported in Table II below. Based on this data, Catalyst C had an average pore diameter of about 102 angstroms. Its total pore volume for pores having diameters in the range of from about 30 to abut 38,000 angstroms was 0.5250 cc/g. Pores having diameters of from about 30 to about 400 angstroms represented 75 percent of this pore volume, while pores having diameters of from about 400 to about 38,000 angstroms represented 25 percent of this volume.

TABLE II

| CATALYST C MERCURY POROSIMETRY DATA | | | |
| --- | --- | --- | --- |
| PRESSURE, PSIA | PORE RADIUS, MICRO-M (ANGSTROMS ×10⁻⁴) | CUMULATIVE INTRUSION VOLUME, CC/GRAM | DIFFERENTIAL VOLUME, CC/GRAM |
| +16.1 | +5.4839 | +0.0000 | +0.0000 |
| +46.8 | +1.8881 | +0.0001 | +0.0001 |
| +283.3 | +0.3120 | +0.0043 | +0.0042 |
| +354.6 | +0.2493 | +0.0111 | +0.0068 |
| +868.4 | +0.1018 | +0.1083 | +0.0972 |
| +1463.2 | +0.0604 | +0.1187 | +0.0103 |
| +1742.6 | +0.0507 | +0.1241 | +0.0055 |
| +2182.2 | +0.0405 | +0.1241 | +0.0000 |
| +2912.3 | +0.0303 | +0.1250 | +0.0008 |
| +3475.9 | +0.0254 | +0.1290 | +0.0040 |
| +3912.1 | +0.0226 | +0.1290 | +0.0000 |
| +4366.2 | +0.0202 | +0.1316 | +0.0026 |
| +4996.3 | +0.0177 | +0.1325 | +0.0010 |
| +5831.5 | +0.0152 | +0.1335 | +0.0010 |

TABLE II-continued

| CATALYST C MERCURY POROSIMETRY DATA | | | |
| --- | --- | --- | --- |
| PRESSURE, PSIA | PORE RADIUS, MICRO-M (ANGSTROMS ×10⁻⁴) | CUMULATIVE INTRUSION VOLUME, CC/GRAM | DIFFERENTIAL VOLUME, CC/GRAM |
| +6256.4 | +0.0141 | +0.1335 | +0.0000 |
| +6725.3 | +0.0131 | +0.1344 | +0.0009 |
| +7340.7 | +0.0120 | +0.1344 | +0.0000 |
| +8029.3 | +0.0110 | +0.1344 | +0.0000 |
| +8820.5 | +0.0100 | +0.1348 | +0.0003 |
| +9787.5 | +0.0090 | +0.1349 | +0.0001 |
| +10989.0 | +0.0080 | +0.1350 | +0.0001 |
| +11648.3 | +0.0076 | +0.1380 | +0.0030 |
| +12439.5 | +0.0071 | +0.1381 | +0.0001 |
| +13450.5 | +0.0066 | +0.1396 | +0.0016 |
| +14608.0 | +0.0061 | +0.1442 | +0.0045 |
| +15926.7 | +0.0055 | +0.1450 | +0.0008 |
| +17523.8 | +0.0050 | +0.1465 | +0.0015 |
| +18549.4 | +0.0048 | +0.1517 | +0.0052 |
| +19604.4 | +0.0045 | +0.1659 | +0.0141 |
| +20732.6 | +0.0043 | +0.1993 | +0.0334 |
| +21948.7 | +0.0040 | +0.2586 | +0.0594 |
| +23340.6 | +0.0038 | +0.3551 | +0.0964 |
| +24893.7 | +0.0036 | +0.4426 | +0.0875 |
| +27091.5 | +0.0033 | +0.4945 | +0.0519 |
| +29142.8 | +0.0030 | +0.5101 | +0.0156 |
| +31677.6 | +0.0028 | +0.5176 | +0.0074 |
| +35135.5 | +0.0025 | +0.5213 | +0.0037 |
| +38974.3 | +0.0023 | +0.5250 | +0.0037 |
| +44205.1 | +0.0020 | +0.5250 | +0.0000 |
| +50417.6 | +0.0018 | +0.5250 | +0.0000 |

EXAMPLE IV

The above catalysts were tested in small multistage catalyst pilot plant unit comprising a tubular reactor having nine separate zones numbered from top to bottom. Zones 5 and 7 in the reactor were 9 inches long and the remaining zones were each 6 inches in length. For each test, Zone 3 contained 30 grams of catalyst and Zones 5 and 7 each contained 60 grams of catalyst. An inert carrier, either alumina or glass beads, was added to these zones to occupy the entire volume of the respective zones. Zones 1 and 9 were inlets and outlets, respectively, for the reactor and were filled with an inert material to aid in distribution of feed and effluent. The remaining zones between the catalyst beds were filled with an inert carrier to occupy available volume within each zone. The reactor tube contained appropriate insulation and heating control so that the overall temperature for the inlets to the three catalyst zones were balanced.

For each catalyst test, the catalyst was precalcined at 1000° F. in air for one hour prior to loading. After loading and pressure testing, the reactor was heated to 900° F. in flowing air over a one-hour period. The catalyst was air treated for one-hour at 900° F., purged with nitrogen, and hydrogen flow was established. The catalysts were then presulfided with dimethyl disulfide, which was added in both an upflow and a downflow manner. This presulfiding was conducted to sulfide the catalyst to a sulfur level of approximately 0.04 weight percent. The unit was then pressurized to 300 psig with hydrogen and reduced at 900° F. for one hour under $H_2$ recycle. The naphtha feed described in Table III below was introduced to the system and the temperature increased to run conditions. Weight balances were obtained two and three times daily under automatic control. During the course of such catalyst test run, the liquid product was stabilized continuously in a small stripping column. The off-gas was analyzed by an on-line gas chromatograph and was averaged by computer over the test period. Axial temperature scans were taken continuously during the test and were also computer averaged. The liquid product was analyzed off-line by gas chromatograph and research octane numbers were obtained by the conventional ASTM engine test.

The reactor was operated in an adiabatic mode. The reactor temperatures and the feed rates were varied to measure octane and yields.

The pilot plant testing equipment contained appropriate recycle and pressure control equipment in addition to standard separation and sampling equipment so that yields of the various materials produced in the reactor could be determined.

For all three Examples the same mid-continent hydrotreated naphtha feed was used. The feed properties are shown in Table III below:

TABLE III

| FEED PROPERTIES | |
|---|---|
| COMPONENT | VOLUME PERCENT |
| PARAFFINS | 50.07 |
| C5 | 0.90 |
| C6 | 5.07 |
| C7 | 9.65 |
| C8 | 11.84 |
| C9 | 10.35 |
| C10 | 8.33 |
| C11 | 3.63 |
| C12+ | 0.31 |
| NAPHTHENES | 37.73 |
| C5 | 0.12 |
| C6 | 2.91 |
| C7 | 8.68 |
| C8 | 9.83 |
| C9 | 8.31 |
| C10 | 5.34 |
| C11 | 2.36 |
| C12+ | 0.18 |
| AROMATICS | 12.19 |
| C6 | 0.55 |
| C7 | 2.43 |
| C8 | 4.20 |
| C9 | 3.84 |
| C10 | 1.17 |
| C11 | 0.0 |
| C12+ | 0.0 |
| F16 | 0.46 |
| F17 | 0.47 |
| RON | 49.4 |
| API GRAVITY | 55.9° |
| ASTM Initial Boiling Point | 164° F. |
| 10% | 217° F. |
| 30% | 240° F. |
| 50% | 260° F. |
| 70% | 290° F. |
| 90% | 326° F. |
| End Boiling Point | 380° F. |
| PPM SULFUR | 0.2 |
| PPM NITROGEN | NA |

Based on the data generated, Catalysts A and B had increased catalytic activity when compared to prior art Catalyst C. This is illustrated in FIG. II where a consistently higher octane product was produced using Catalysts A and B. There is almost a four octane number increase throughout the test period for Catalysts A and B. This is significant, especially where the selectivity of the Catalysts A and B for the production of $C_{5+}$ liquids is not reduced.

The data in FIG. III show that the selectivity of Catalysts A and B was very slightly changed when compared to prior art Catalyst C. As previously discussed, Catalyst A appears to have a slightly better selectivity compared to Catalyst B, since the former lies at the upper level of the 95 percent confidence interval while the latter lies at the lower level of the interval.

The improved properties of Catalysts A and B, described above, are all related to the modified pore size distribution illustrated in FIGS. I and IA. In particular, there is a shifting of the pore size for the invention catalyst illustrated (Catalyst A). This shift results in an increased pore volume in pores having diameters of from about 400 angstroms up to about 38,000 angstroms along with a decrease in the pore volume in pores having diameters of from about 30 angstroms up to about 400 angstroms. In addition to the gross pore volume changes described above, FIGS. I and IA also show a change in the distribution of the pore volume for the various pore radii reported.

We claim as our invention:

1. In a naphtha reforming catalyst having at least one catalytic metal deposited on a porous solid catalyst support, an improvement which comprises the catalyst having the following in combination:
   (A) A surface area above about $250M^2$/gram of catalyst;
   (B) A pore volume above about 0.4 cc/gram of catalyst in pores having diameters of from about 30 angstroms to about 38,000 angstroms; and
   (C) A pore volume distribution wherein about 70 percent or less of said pore volume is in pores having diameters of from about 30 angstroms to about 400 angstroms, and 30 percent or more of said pore volume is in pores having diameters of from about 400 angstroms to about 38,000 angstroms.

2. The catalyst of claim 1 further characterized wherein about 68 percent or less of said pore volume is in pores having diameters of from about 30 angstroms to about 400 angstroms and about 32 percent or more of said pore volume is in pores having diameters of from about 400 angstroms to about 38,000 angstroms.

3. The catalyst of claim 1 further characterized in that said catalytic metal is selected from the group consisting of platinum and palladium or mixtures thereof.

4. The catalyst of claim 2 further characterized in that said catalytic metal is selected from the group consisting of platinum and palladium or mixtures thereof.

5. The catalyst of claim 1 further characterized in that said surface area is above about $275M^2$/gram of catalyst.

6. The catalyst of claim 5 further characterized in that said surface area is above about $300M^2$/gram of catalyst.

7. The catalyst of claim 1 further characterized in that said pore volume is above about 0.45 cc/gram of catalyst.

8. The catalyst of claim 7 further characterized in that said pore volume is above about 0.5 cc/gram of catalyst.

9. The catalyst of claim 1 further characterized in that:
   (A) 68 percent or less of said pore volume is in pores having diameters of from about 30 angstroms to about 400 angstroms and 32 percent or more of said pore volume is in pores having diameters of from about 400 angstroms to about 38,000 angstroms;
   (B) Said surface area is above about $275M^2$/gram of catalyst;
   (C) Said pore volume is above about 0.45 cc/gram of catalyst; and (D) The catalytic metal is selected from the group consisting of platinum and palladium or mixtures thereof.

10. The catalyst of claim 9 further characterized in that:
(A) About 65 percent of said pore volume is in pores having diameters of from about 30 angstroms to about 400 angstroms and about 35 percent of said pore volume is in pores having diameters of from about 400 angstroms to about 38,000 angstroms;
(B) Said surface area is above about 300M$^2$/gram of catalyst; and
(C) Said pore volume is above about 0.5 cc/gram of catalyst.

11. The catalyst of claim 1 further characterized in that said pore volume distribution is substantially as set forth for Catalyst A in FIG. I or FIG. IA herein.

12. The catalyst of claim 9 further characterized in that said pore volume distribution is substantially as set forth for Catalyst A in FIG. I or FIG. IA herein.

13. The catalyst of claim 1 further characterized in that said pore volume distribution is substantially as set forth in Columns 2 and 4 of Table I herein.

14. The catalyst of claim 9 further characterized in that said pore volume distribution is substantially as set forth in Columns 2 and 4 of Table I herein.

15. In a naphtha reforming catalyst having at least one catalytic metal deposited on a porous solid support, an improvement which comprises the catalyst having the following in combination:
(A) A surface area above about 250M$^2$/gram of catalyst;
(B) A pore volume above about 0.4 cc/gram of catalyst; and
(C) A pore volume distribution for pores having diameters of from about 30 angstroms to about 38,000 angstroms as substantially as set forth for Catalyst A in FIG. I or FIG. IA herein.

16. The catalyst of claim 15 further characterized in that said catalytic metal is selected from the group consisting of platinum and palladium or mixtures thereof.

17. The catalyst of claim 15 further characterized in that said surface area is above about 275M$^2$/gram of catalyst.

18. The catalyst of claim 17 further characterized in that said surface area is above about 300M$^2$/gram of catalyst.

19. The catalyst of claim 15 further characterized in that said pore volume is above about 0.45 cc/gram of catalyst.

20. The catalyst of claim 19 further characterized in that said pore volume is above about 0.5 cc/gram of catalyst.

21. The catalyst of claim 15 further characterized in that:
(A) Said surface area is above about 275 M$^2$/gram of catalyst;
(B) Said pore volume is above about 0.45 cc/gram of catalyst; and
(C) The catalytic metal is selected from the group consisting of platinum and palladium or mixtures thereof.

22. The catalyst of claim 15 further characterized in that:
(A) Said surface area is above about 300M$^2$/gram of catalyst;
(B) Said pore volume is above about 0.5 cc/gram of catalyst; and
(C) The catalytic metal is selected from the group consisting of platinum and palladium or mixtures thereof.

23. In a naphtha reforming catalyst having at least one catalytic metal deposited on a porous solid support, an improvement which comprises the catalyst having the following in combination:
(A) A surface area above about 250M$^2$/gram of catalyst;
(B) A pore volume above about 0.4 cc/gram of catalyst; and
(C) A pore volume distribution for pores having diameters of from about 30 angstroms to about 38,000 angstroms as substantially as set forth in Columns 2 and 4 of Table I herein.

24. The catalyst of claim 23 further characterized in that said catalytic metal is selected from the group consisting of platinum and palladium or mixtures thereof.

25. The catalyst of claim 23 further characterized in that said surface area is above about 275M$^2$/gram of catalyst.

26. The catalyst of claim 25 further characterized in that said surface area is above about 300M$^2$/gram of catalyst.

27. The catalyst of claim 23 further characterized in that said pore volume is above about 0.45 cc/gram of catalyst.

28. The catalyst of claim 27 further characterized in that said pore volume is above about 0.5 cc/gram of catalyst.

29. The catalyst of claim 23 further characterized in that:
(A) Said surface area is above about 275M$^2$/gram of catalyst;
(B) Said pore volume is above about 0.45 cc/gram of catalyst; and
(C) The catalytic metal is selected from the group consisting of platinum and palladium or mixtures thereof.

30. The catalyst of claim 23 further characterized in that:
(A) Said surface area is above about 300M$^2$/gram of catalyst;
(B) Said pore volume is above about 0.5 cc/gram of catalyst; and
(C) The catalytic metal is selected from the group consisting of platinum and palladium or mixtures thereof.

31. The catalyst of claim 3 further characterized in that said catalytic metal also contains a metal selected from the group consisting of tin and rhenium.

32. The catalyst of claim 4 further characterized in that said catalytic metal also contains a metal selected from the group consisting of tin and rhenium.

33. The catalyst of claim 9 further characterized in that said catalytic metal also contains a metal selected from the group consisting of tin and rhenium.

34. The catalyst of claim 10 further characterized in that said catalytic metal also contains a metal selected from the group consisting of tin and rhenium.

35. The catalyst of claim 16 further characterized in that said catalytic metal also contains a metal selected from the group consisting of tin and rhenium.

36. The catalyst of claim 21 further characterized in that said catalytic metal also contains a metal selected from the group consisting of tin and rhenium.

37. The catalyst of claim 22 further characterized in that said catalytic metal also contains a metal selected from the group consisting of tin and rhenium.

38. The catalyst of claim 24 further characterized in that said catalytic metal also contains a metal selected from the group consisting of tin and rhenium.

39. The catalyst of claim 29 further characterized in that said catalytic metal also contains a metal selected from the group consisting of tin and rhenium.

40. The catalyst of claim 30 further characterized in that said catalytic metal also contains a metal selected from the group consisting of tin and rhenium.

* * * * *